Oct. 9, 1934.   G. P. BOEHM   1,976,695
FISHING LURE
Filed Jan. 6, 1932
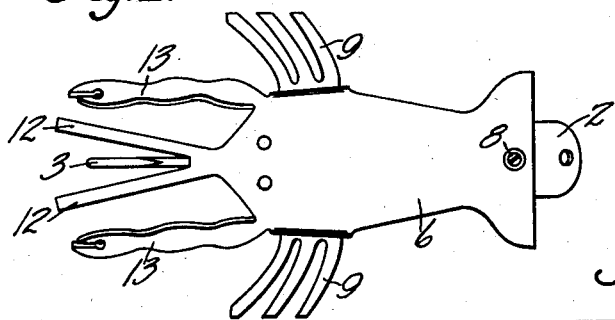
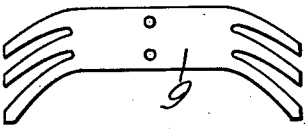
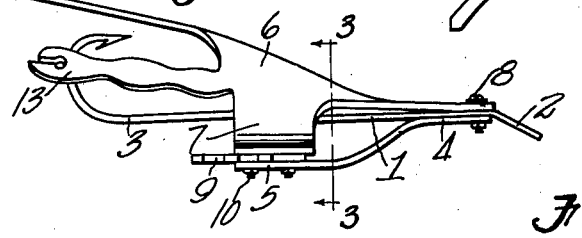
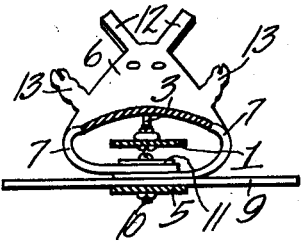
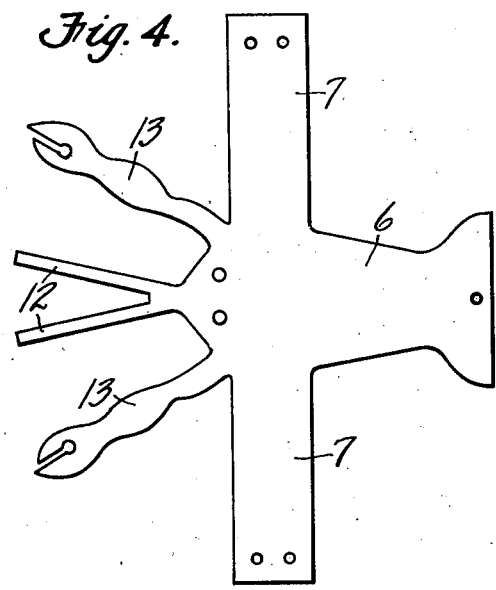
INVENTOR.
George P. Boehm.
BY
ATTORNEY.

Patented Oct. 9, 1934

1,976,695

UNITED STATES PATENT OFFICE 1,976,695

FISHING LURE

George P. Boehm, Chicago, Ill., assignor to South Bend Bait Company, South Bend, Ind.

Application January 6, 1932, Serial No. 584,988

8 Claims. (Cl. 43—42)

The invention relates to fishing lures, and particularly to fishing lures simulating in shape various species of animal, insect or marine life, such as mice, crawfish, frogs and the like.

I have found that a very satisfactory simulation of a mouse, crawfish, frog, or the like may be simply and inexpensively made by configuring and bending a sheet of flexible material and mounting the same on a frame to secure it in desired bent shape. It is therefore the object of my invention to provide a lure of this character in which the body is formed of a configured sheet of flexible material mounted on a frame in bent or flexed relation to simulate a species of animal, insect or marine life.

Other objects of the invention will be apparent from the appended description and claims, it being understood that changes in the precise embodiment of the invention may be made within the scope of what is claimed without departing from the spirit of the invention.

In the drawing:

Figure 1 is a top plan view of the lure.

Figure 2 is a view of the lure in side elevation.

Figure 3 is a transverse vertical sectional view of the lure taken on line 3—3 of Figure 2.

Figure 4 is a plan view of the body-forming blank.

Figure 5 is a plan view of a configured blank forming the legs of a crawfish illustrated in the drawing.

Referring to the drawing, which illustrates a lure formed to resemble a crawfish, the numeral 1 designates a flat metal plate having a forward downwardly angularly bent portion 2 to which a suitable line attaching means may be secured. A hook 3 is fixedly secured to the plate 1 adjacent the rear end thereof and extends rearwardly therefrom in substantially parallel relation thereto. A second metal plate 4 is fixedly secured to plate 1 rearwardly of portion 2 thereof and at the under side thereof. The plate 4 is bent angularly downwardly from plate 1 rearwardly of its connection therewith and terminates in a portion 5 extending parallel to plate 1 in spaced relation therebelow.

A blank 6, preferably formed of a sheet of rubber and configured to simulate a crawfish, as shown, or any other species of marine, animal or insect life, is carried by the frame, and includes laterally extending portions or flaps 7 projecting from the sides of the blank intermediate the length thereof. The blank 6 is positioned at the upper side of the plate 1 and is secured thereto at one end by the bolt 8 which secures the plates 1 and 4 together at their forward ends. The laterally extending portions or flaps 7 are downwardly and inwardly bent around the plate 1 with their ends adjacent the off-set portion 5 of plate 4. Another blank 9, also formed of a sheet of rubber, is provided for the lure when the same is to resemble a crawfish, and its opposite ends are configured to simulate the legs of a crawfish. The ends of the laterally extending flaps 7 of blank 6, and the central portion of blank 9, are secured to portion 5 of the plate 4 by means of bolts 11 passing therethrough and having one end thereof engaging portion 5 of plate 4 and the other end thereof engaging a washer 10 which overlies said rubber members 7 and 9. The rear or free end of the blank 6 is configured to provide members 12 simulating the feelers of a crawfish, and members 13 simulating claws; and the configured opposite projecting ends of blank 9 simulate the legs of the crawfish.

It will thus be seen that by the use of one or more suitably configured blanks formed of a sheet of rubber or other suitable flexible material bent around and secured to a mounting frame, which may also carry a hook, a very simple lure of this character is provided. The bent portion of the blank resembles the body of the crawfish, the remainder of blank 6 the tail of the crawfish, and the appendages 12 and 13 the feelers and claws of the crawfish. The likeness of the lure to a crawfish may also be further enhanced by coloration thereof. The body-forming blanks may be quickly and easily cut from a sheet of material in large quantities at small expense, and the assembly thereof is very simple, and these features combined allow a lure of this character to be made at a cost much lower than previous similar lures, whereby they may be sold at a price low enough to make them commercially acceptable.

The invention having been set forth, what is claimed as new and useful is:—

1. In a fishing lure, a metal plate, a second metal plate secured to said first plate at one end thereof and spaced from said first plate at its other end, a hook carried by said first plate to extend rearwardly thereof, a configured flexible blank having a pair of opposite laterally extending flaps formed intermediate the ends thereof, said blank being mounted on the upper side of said first plate and secured thereto at its forward end, said laterally extending flaps being bent around said first plate with their ends positioned adjacent the end of said second plate, a washer overlying the ends of said flaps, and securing means extending through the ends of said flaps and between said second plate and washer, said blank having rearwardly extending configured appendages positioned adjacent said hook.

2. In a fishing lure, a metal plate, a second metal plate carried by said first plate at one end thereof and spaced from said first plate at its other end, a hook carried by said first plate and extending rearwardly thereof, a configured flexible blank secured at one end to the forward upper side of said first plate, flaps projecting laterally of the sides of said blank intermediate the ends thereof, said flaps being bent around said first plate into engagement with said second plate, a washer overlying the ends of said flaps, and securing means extending between said washer and second plate and through the ends of said flaps, said blank being configured and bent to simulate a species of marine, animal or insect life.

3. In a fishing lure, a metal plate, a second metal plate carried by said first plate at one end thereof and spaced from said first plate at its other end, a hook carried by said first plate and projecting rearwardly thereof, a configured flexible blank secured at one end to said first plate, flaps projecting laterally of said blank intermediate the ends thereof and bent around said first plate with their ends positioned adjacent the end of said second plate, and means securing the ends of said flaps to said second plate.

4. In a fishing lure, a frame, a hook carried by said frame and projecting rearwardly therefrom, a configured flexible blank secured at one end to the forward upper side of said frame, flaps projecting laterally of said blank intermediate the ends thereof and bent around said frame, and configured appendages projecting rearwardly of said blank adjacent said hook, said blank and appendages being configured and bent to simulate a species of marine, animal or insect life.

5. In a fishing lure, a skeleton frame, a hook carried by said frame, and a configured sheet of flexible material bent relative to said frame to simulate the body of a live bait with the opposite sides of said sheet engaging each other and said frame and secured to said frame and having sufficient body to retain its shape independent of said frame, the portions of said body spaced from said securing means being normally positioned in spaced relation to said frame.

6. In a fishing lure body, a frame comprising a thin elongated plate, and a configured sheet of flexible material secured to said frame at spaced points thereof, said sheet being bent to a shape simulating the body of a live bait whereby the shape of said sheet is dissimilar to the shape of said frame on a transverse section through said lure body.

7. In a fishing lure body, a rigid frame, and a sheet of flexible material fixedly secured to said frame at spaced points thereof, said material being bent to a predetermined shape which it normally retains by its own body, whereby the shape of the portion of said body between the spaced points at which it is secured to the frame is dissimilar to the shape of the corresponding portions of the frame.

8. In a fishing lure, a rigid frame, a hook carried by said frame, a flexible sheet, means securing said sheet to said frame, said sheet being bent relative to said frame whereby portions of said sheet in planes transverse of the lure and coincident with said securing means are spaced from said frame.

GEORGE P. BOEHM.